C. H. HATHAWAY, W. A. STARCK AND L. F. McEVOY.
AUTOMOBILE BUMPER.
APPLICATION FILED JULY 16, 1920.
1,386,864.
Patented Aug. 9, 1921.
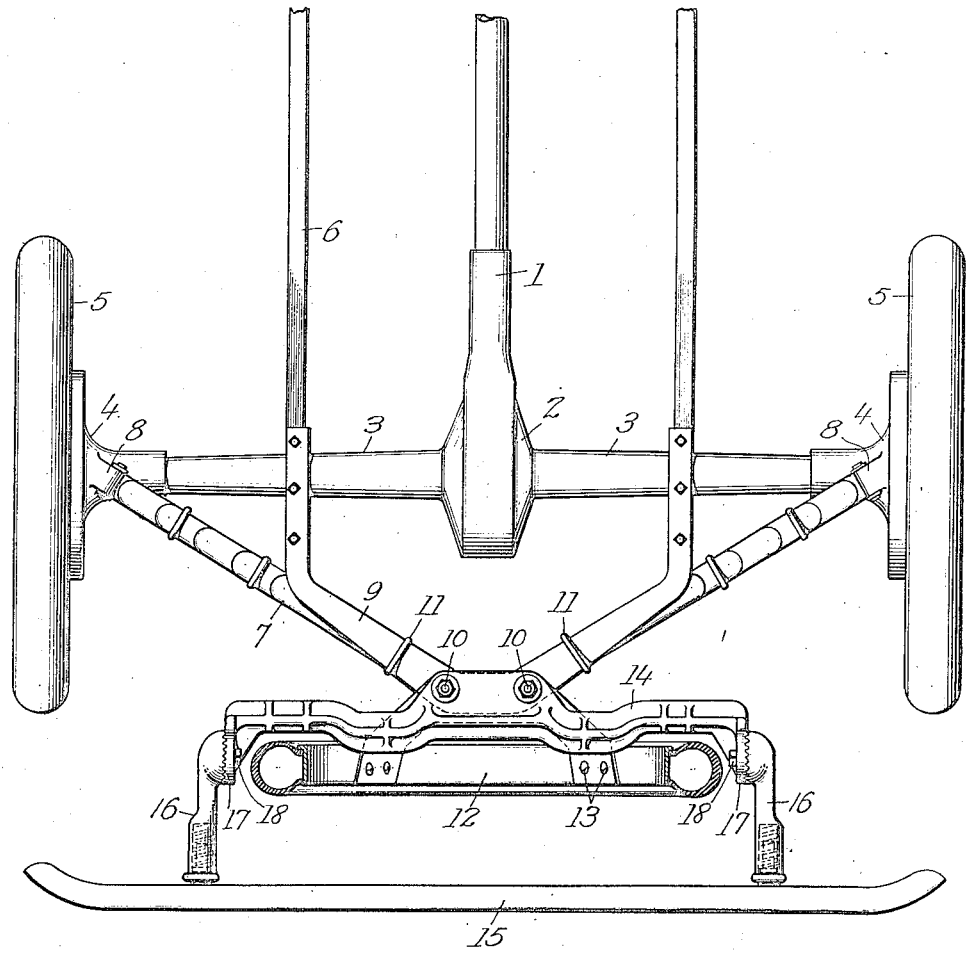
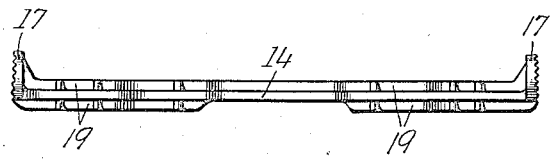
Inventors:
CHARLES H. HATHAWAY
WILLIAM A. STARCK
LEO F. McEVOY
By Edwin B. H. Tower Jr. Atty.

UNITED STATES PATENT OFFICE.

CHARLES H. HATHAWAY, OF WEST ALLIS, AND WILLIAM A. STARCK AND LEO F. McEVOY, OF MILWAUKEE, WISCONSIN, ASSIGNORS TO BADGER MANUFACTURING CORPORATION, OF MILWAUKEE, WISCONSIN, A CORPORATION OF DELAWARE.

AUTOMOBILE-BUMPER.

1,386,864.   Specification of Letters Patent.   Patented Aug. 9, 1921.

Application filed July 16, 1920. Serial No. 396,750.

*To all whom it may concern:*

Be it known that we, CHARLES H. HATHAWAY, WILLIAM A. STARCK, and LEO F. McEVOY, citizens of the United States, residing, respectively, at West Allis, in the county of Milwaukee and State of Wisconsin, Milwaukee, in the county of Milwaukee and State of Wisconsin, and Milwaukee, in the county of Milwaukee and State of Wisconsin, have invented new and useful Improvements in Automobile-Bumpers, of which the following is a specification.

This invention relates to automobile bumpers.

It is particularly applicable to an Overland automobile, but may be used with other automobiles.

Heretofore, bumpers have been supported at a plurality of relatively widely separated points. This has necessitated the use of numerous special attachments for holding the bumper in position. The present invention overcomes these objections and allows the bumper to be centrally supported without the use of numerous attachments.

One of the objects of this invention is to provide a simple, rugged, durable and inexpensive bumper.

Another object is to provide a bumper which may be supported or attached to the vehicle at substantially a single point.

Another object is to provide a bumper which may be applied to the car as a self contained unit without requiring independent connection at a plurality of widely separated points.

Another object is to provide a bumper which may be readily supported centrally of the car.

Another object is to provide a bumper rigidly supported by and centrally with respect to the automobile and supporting the bumper bar at relatively widely separated points and rigidly supported.

Another object is to provide a bumper which may be strongly braced and so arranged that it may be readily applied to the rear of an automobile without interfering with the spare tire support.

Another object is to provide a bumper which may be supported centrally of the vehicle without requiring supporting arms of undue length.

Another object is to provide a bumper adjustably carried on a centrally supported bar.

Other objects and advantages will hereinafter appear.

According to the invention, the bumper comprises a bumper bar having rearwardly extending arms fastened to opposite ends of a transverse bracket centrally supported on the frame of a vehicle whereby the bumper may be mounted as a self contained unit at a substantially single centrally disposed point. The bumper bar is supported at relatively widely separated points while the bumper as a unit is supported at substantially a single point.

An embodiment of the invention is illustrated in the accompanying drawing, wherein—

Figure 1 is a plan of the bumper attached to the rear of an automobile.

Fig. 2 is a front elevation of the central transverse supporting bar or bracket of the bumper.

Fig. 1 shows the bumper applied to the rear of an Overland automobile, in such a manner as to permit the ready removal of the spare rim and tire.

The rear portion of the automobile is shown as including the transmission casing 1 extending forward from the differential casing 2, and the rear axle housing 3 extending laterally therefrom. A housing 4 for the brake mechanism is carried at the outer end of the axle housing 3, and the wheels 5 are mounted in the usual manner upon the axle.

The chassis frame 6 is supported at the rear by leaf springs 7 in such a manner that it is not feasible to mount a bumper in the usual manner without employing rearwardly extending arms or brackets of undue length.

The leaf springs 7 at their outer and lower ends are suitably supported in brackets 8 on the brake housing 4, while the inner and upper ends thereof are spaced apart and are supported by the cross connecting channel bar 9, being connected thereto by ordinary bolts 10 and U bolts 11.

A spare tire carrier 12 is supported on a bracket 13 which may be secured to the channel bar 9 by means of the bolts 10 or other suitable means.

It is essential in mounting a bumper on the automobile that it be so supported as not to interfere with the use of the tire carrier 12, and this should preferably be done without using longitudinally extending bracket arms of undue length.

The bumper shown in the drawings meets the above conditions and comprises a laterally extending bracket 14, on which a bumper 15 is adjustably supported. The bracket 14 is supported at substantially the middle thereof on the channel bar 9 and is fastened thereto by the bolts 10.

The bumper bar 15 is adjustably carried on the supporting bracket 14 by means of a well-known form of rearwardly extending arms or brackets 16. One end of each arm 16 is attached to the bumper bar 15 at separated points thereon, while the other end thereof is adjustably connected to the supporting bracket 14 to permit movement of the bumper bar 15 about the supporting bracket 14. For this purpose the bracket 14 is provided at each end with an arm 17 having a serrated face coöperating with corresponding serrated faces on the rear end of the arms 16. These arms and the bumper bar are held in proper adjusted position by bolts 18 or other suitable means.

The transverse supporting bracket 14 may be formed of any suitable metal or alloy, and is preferably provided with strengthening ribs 19. The bracket at the middle thereof is provided with a projecting fin having openings through which the bolts 10 may pass. Thus the bumper as a unit may be readily mounted upon the rear cross connecting channel bar 9 of the automobile frame. Other means may, of course, be employed for mounting the bumper at a substantially single central point.

A bumper of the above character forms a simple, strong, and compact unit which may readily be applied by supporting at a single central point. Supporting arms of excessive length for the bumper bar are avoided, and there is no interference with tire support.

A unitary centrally supported bumper of this character may be provided for the front, as well as for the rear.

While one embodiment has been illustrated and described for purposes of illustration, it is understood that various changes and modifications may be made without departing from the spirit and scope of this invention.

What is claimed is:

1. An automobile bumper comprising a bumper bar, rearwardly extending detachable arms connected therewith at separated points thereon, a transverse supporting bracket connected to the rear ends of the arms, and means for attaching the transverse supporting bracket to the automobile at a point between the ends of the bracket.

2. An automobile bumper comprising a bumper bar, rearwardly extending arms connected thereto and detachable therefrom, a bracket supported at its center, and means connecting the arms to the bracket for centrally supporting the bumper.

3. An automobile bumper comprising a horizontal bumper bar, two brackets fastened thereto and extending rearwardly therefrom, a transverse bracket secured at its center to an automobile chassis and having a forwardly extending arm on each end thereof, means carried by said arms and coöperating with the rear ends of said rearwardly extending brackets whereby the bumper may be adjusted to different horizontal planes.

4. An automobile bumper comprising a bumper bar and means for mounting the bumper at substantially a single point, said means including rearwardly extending detachable arms connected to the bar and a transverse bracket spaced from the bumper bar and connected to the arms and adapted to be supported between its ends upon the automobile.

5. An automobile bumper comprising a unitary structure including a bumper bar, a plurality of rearwardly extending arms connected thereto, a supporting bracket extending substantially parallel with the bumper bar and adjustably connected to said arms and adapted to be centrally supported on the automobile.

6. In a bumper adapted for use on an automobile whose frame is resiliently supported by a divided spring having the inner ends thereof terminate in a transverse plane separated from the transverse plane of the outer ends, the combination of a bumper bar, rearwardly extending arms connected to the bar intermediate the ends thereof, and means connecting said arms and providing a central support on the resiliently supported frame.

7. A bumper comprising a bumper bar, rearwardly extending arms connected therewith, a rigid transverse supporting bracket having the free ends of the arms adjustably connected thereto, to permit movement of the bumper bar about the transverse bracket.

and means for mounting the bumper between the ends of the supporting arm.

8. The combination of rearwardly extending centrally disposed springs supporting the frame of an automobile, a transverse supporting bracket attached to the frame, a transverse bumper bar substantially parallel to said supporting bracket, and a pair of rearwardly extending arms detachably connected at their opposite ends to the bracket and the bar respectively and spacing the same apart.

In witness whereof, we have hereunto subscribed our names.

CHAS. H. HATHAWAY.
WILLIAM A. STARCK.
LEO F. McEVOY.